US012588122B2

(12) United States Patent
Elferich et al.

(10) Patent No.: US 12,588,122 B2
(45) Date of Patent: Mar. 24, 2026

(54) LIGHTING CIRCUIT

(71) Applicant: SIGNIFY HOLDING B.V., Eindhoven (NL)

(72) Inventors: Reinhold Elferich, Aachen (DE); Olexandr Valentynovych Vdovin, Maarheeze (NL); Dominique Maria Bruls, Heeze (NL); Eugen Jacob De Mol, Eindhoven (NL); Hugo Johan Cornelissen, Escharen (NL); Karnekumar Arulandu, Breda (NL); Matthias Wendt, Würselen (DE); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 247 days.

(21) Appl. No.: 18/283,053

(22) PCT Filed: Mar. 15, 2022

(86) PCT No.: PCT/EP2022/056637
§ 371 (c)(1),
(2) Date: Sep. 20, 2023

(87) PCT Pub. No.: WO2022/200116
PCT Pub. Date: Sep. 29, 2022

(65) Prior Publication Data
US 2024/0334570 A1 Oct. 3, 2024

(30) Foreign Application Priority Data
Mar. 23, 2021 (EP) .................................... 21164340

(51) Int. Cl.
*H05B 45/48* (2020.01)
*H05B 45/10* (2020.01)
(Continued)

(52) U.S. Cl.
CPC ............ *H05B 45/48* (2020.01); *H05B 45/10* (2020.01); *H05B 45/20* (2020.01); *H05B 45/325* (2020.01); *H05B 45/33* (2020.01); *H05B 45/335* (2020.01)

(58) Field of Classification Search
CPC ...... H05B 45/10; H05B 45/20; H05B 45/325; H05B 45/33; H05B 45/335; H05B 45/48
See application file for complete search history.

(56) References Cited

U.S. PATENT DOCUMENTS

2012/0153845 A1 6/2012 Roberts
2014/0049189 A1 * 2/2014 Ter Weeme ........... H05B 45/18 315/296
(Continued)

FOREIGN PATENT DOCUMENTS

DE 20218757 U1 2/2003
JP 2011527078 A 10/2011
(Continued)

*Primary Examiner* — Raymond R Chai

(57) ABSTRACT

A lighting circuit comprises a first light source arrangement and a second light source arrangement, of different types, in series. A driver delivers a controllable current to the light source circuit, with an adjustable DC component and an adjustable modulated component, for example an adjustable duty cycle of a superposed pulse width modulated component. This enables control of the contributions to the overall light output flux from the different types of light source.

19 Claims, 5 Drawing Sheets

(51) Int. Cl.

| | |
|---|---|
| ***H05B 45/20*** | (2020.01) |
| ***H05B 45/325*** | (2020.01) |
| ***H05B 45/33*** | (2020.01) |
| ***H05B 45/335*** | (2020.01) |

(56) References Cited

U.S. PATENT DOCUMENTS

2014/0145628 A1 5/2014 Wang et al.
2014/0361696 A1 12/2014 Siessegger et al.
2019/0132914 A1* 5/2019 Gong .................... H05B 47/105
2021/0298155 A1* 9/2021 Chen .................... G08B 15/002

FOREIGN PATENT DOCUMENTS

JP 2015109146 A 6/2015
JP 2020523752 A 8/2020
JP 7704367 B2 * 7/2025 ........... H05B 45/325
WO 2009039132 A1 3/2009
WO 2013110052 A1 7/2013
WO 2018229022 A1 12/2018

* cited by examiner

LIGHTING CIRCUIT

CROSS-REFERENCE TO PRIOR APPLICATIONS

This application is the U.S. National Phase application under 35 U.S.C. § 371 of International Application No. PCT/EP2022/056637, filed on Mar. 15, 2022, which claims the benefit of European Patent Application No. 21164340.8, filed on Mar. 23, 2021. These applications are hereby incorporated by reference herein.

FIELD OF THE INVENTION

This invention relates to lighting circuits, and in particular lighting circuits which combine different types of light source.

BACKGROUND OF THE INVENTION

LED lighting is replacing more traditional lighting forms in almost all lighting applications. LED lighting is energy efficient as well as offering simple control of light output color, directional control, as well as static and dynamic lighting effects.

However, laser diodes (LDs) still offer increased light output flux with very small beam divergence for high brightness lighting systems.

In addition to LEDs and laser diodes, another type of solid state semiconductor light source is superluminescent diodes (SLED). These combine the features of laser diodes and light emitting diodes. SLEDs, similar to laser diodes, are high brightness sources with small beam divergence, but they exhibit broader spectral compositions and lower temporal coherence, which manifests in much less pronounced speckle compared to lasers.

Superluminescent diodes, contrary to laser diodes, do not have resonator mirrors in the active region and for SLEDs the spontaneous emission light is amplified by stimulated emission during the propagation through the active layer. This light is called superluminescence, and since the spontaneous emission light is a seed light having a random phase and a broad spectrum, the superluminescence also becomes a low-coherence light with a broadband spectrum. SLEDs, similar to laser diodes, exhibit threshold-like behavior of light-current-voltage (LIV) characteristics.

There are also hybrid lighting systems which combine the advantages of different types of light source, such as laser diodes and LEDs, enabling high brightness color tunable lighting systems.

When different types of light source are to be combined, the standard approach is to control their currents separately with individually controllable current drivers. This is the general approach because the different types of light source have different flux versus drive current characteristics.

FIG. 1 shows a graph of light output flux (y-axis) versus drive current (x-axis), for an LED (plot 10) and for a laser diode (plot 12). The flux values (Φ_LED_rel and Φ_LD_rel) are shown as relative values, based on a normalized (hence equal) maximum flux value for the two light sources.

The laser diode exhibits a threshold current i_th_LD i.e., a current below which the laser diode generates hardly any light, and this threshold is not present in the LED characteristic. The laser diode characteristic also has a less pronounced droop, namely the flux vs. current diagram of the LED flattens off more at increased drive levels than the characteristic for the laser diode.

It is desirable to be able to control the contributions to the overall light output flux from different types of light source, for example to control the output color resulting from the combination of the light outputs. It would however be desirable to be able to achieve this with a combined driver for a single string configuration, hence with only two connectors, at the ends of the string.

SUMMARY OF THE INVENTION

The invention is defined by the claims.

According to examples in accordance with an aspect of the invention, there is provided a lighting circuit, comprising:

- a light source circuit comprising a first light source arrangement and a second light source arrangement, of a different type to the first light source arrangement, in series; and
- a driver for delivering a controllable current to the light source circuit, wherein the driver is configurable to set a DC component of the controllable current and to set a modulation of a superposed modulated component of the controllable current.

This lighting circuit uses a series connection (string) of first and second light source types, and hence with only two connectors. The drive current used is a modulated driving current with a DC offset. The DC offset and the modulation are adjustable.

Preferably, the controllable current provided to the light source circuit provides a light output distribution between the first light source arrangement and the second light source arrangement.

In one set of examples, the first light source arrangement is a LED arrangement and the second light source arrangement is a laser diode arrangement and/or a superluminescent diode arrangement.

This lighting circuit for example uses a series connection (string) of LEDs and laser diodes, and hence with only two connectors.

The driver for example sets a modulation by setting a duty cycle of a superposed pulse width modulated component of the controllable current. It may also optionally set a frequency of the pulse width modulation. It may also optionally set the amplitude of the pulse width modulated component. Generally, the driver may thus be configurable to set the frequency and/or amplitude of the superposed modulated component.

The lighting circuit exploits differences between the two light source types, in particular different light source technologies. A first difference is a threshold current characteristic and a second difference is a flux-current characteristic.

The DC component for example exploits the different threshold currents of a laser diode or superluminescent diode arrangement compared to a LED arrangement, in order to alter the ratio of light output flux between the LEDs and the laser diodes or superluminescent diodes. The larger the DC component (compared to the modulation amplitude), the more the light output of the LEDs is pronounced because of the absence of a threshold current in LEDs.

The resulting modulation pattern applied by the driver allows, to some extent, independent control of the respective radiations from the two different types of light source.

The driver is for example configurable to set a DC current component below a threshold current of the laser diode or superluminescent diode arrangement. The LED arrangement may thus be operated below the laser threshold current in order to effectively control the LED arrangement separately from the laser diode or superluminescent diode arrangement. This gives a first operating point for the circuit with only the LED arrangement emitting light.

The modulated component and the DC component may have different relative sizes. For example, the maximum amplitude of the superposed pulse width modulated component (or the single amplitude if it is not adjustable) is for example at most 5 times the maximum amplitude of the DC component. The amplitude of the superposed modulated component may for example be set to zero for the case that only LED emission is desired.

Different types and colors of light source have different threshold currents (for example laser diodes may have threshold currents in the range 0.1 A to 1 A) and different (continuous) maximum currents (for example in the range 1 A to 4 A). High power blue laser diodes are available with a continuous wave 5 A current, but the maximum current values are increasing over time with the increasing wattage of newly developed diode chips. For short pulse operation these maximum values can be overcome by a factor of several times. For ns pulses, driving maybe 10 A or higher.

The lasing current threshold for laser diodes is temperature-dependent and is typically 0.1 to 0.3 times the rated DC current.

Studies of LEDs show that droop becomes visible from DC currents of around 0.5 times the rated DC current. An upper limit of the amplitude is for example around two times the rated DC current, in order to avoid significantly compromising the lifetime of the LED or driving at an inefficient operating condition.

Generic components may operate at a current up to around 4 A, whereas components that make use of an internal parallel configuration may operate at a higher current e.g. up to 20 A.

The maximum amplitude of the DC component is for example 20A or less, and the amplitude of the DC component for example may be controlled in the range OA to the maximum. Similarly, the maximum amplitude of the superposed pulse width modulated component (or the single amplitude if the amplitude is not adjustable) is for example 20A or less. The driver may be configurable to additionally set the amplitude of the superposed pulse width modulated component. In such a case, the amplitude of the superposed pulse width modulated component for example may be controlled in the range of OA to the maximum.

Amplitude control as well as duty cycle control enables an increased range of possible combinations of LED flux and laser diode flux.

The lighting circuit may further comprise a capacitor circuit in parallel with the LED arrangement.

The capacitor circuit makes the characteristics of the overall circuit frequency-dependent so that frequency control may be used to create different responses from the LED arrangement and the laser diode arrangement or even between different LED arrangements. In the latter case, the parallel capacitor may be used to alter the electrical characteristics of a particular LED type, and thereby provide additional flux modulation.

In particular, the non-linear flux-current characteristic of the LED means that an average current (when operating at high frequency) gives a different light output to a lower frequency slowly cyclic current. The capacitor circuit also smooths a high peak with a short interval to a lower peak with a longer interval, which may be beneficial for the life-time of the LED.

The driver is thus preferably then configurable to set the frequency of the superposed pulse width modulated component.

The driver may be configurable to set the frequency of the superposed pulse width modulated component selectively above or below a frequency corresponding to a time constant of the combination of the LED arrangement and the capacitor circuit.

With the parallel capacitor arrangement, a decrease of the PWM frequency below a frequency corresponding to the resulting time constant can thereby shift the relative light output toward the laser diode arrangement, because the droop effect is less pronounced for the laser diode arrangement.

This effect occurs at high light levels whereas the threshold related effect explained above (making use of the DC current component) dominates at low light levels.

The LED arrangement may comprise at least two sets of LEDs in series, and the capacitor circuit may comprise a respective capacitor circuit in parallel with each set of LEDs. This may then define different LEDs with different frequency behavior.

Alternatively, the LED arrangement again may comprise at least two sets of LEDs in series, and the capacitor circuit comprises a capacitor circuit in parallel with only a subset of the sets of LEDs.

For a particular example, the driver generates an output that consists of the summed individual outputs; a DC output and a modulated (e.g. pulsed) output. The individual outputs may be realized by individual power converters or a combined power converter.

The driver for example comprises a first part for delivering the DC component and a second part for delivering the modulated component.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
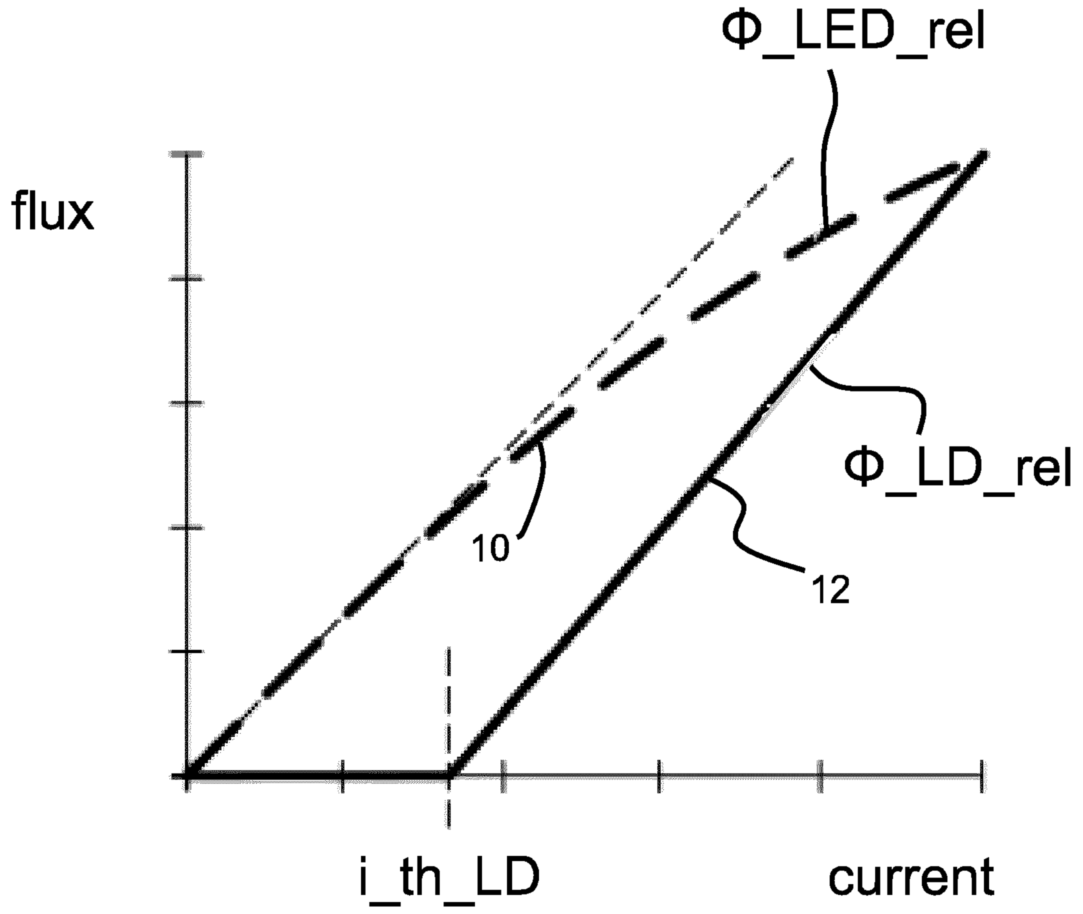
FIG. 1 shows a graph of light output flux (y-axis) versus drive current (x-axis), for an LED and for a laser diode.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting circuit comprising a first light source arrangement and a second light source arrangement, of different types, in series. A driver delivers a controllable current to the light source circuit, with an adjustable DC component and an adjustable modulated component, for example an adjustable duty cycle of a superposed pulse width modulated component. This enables control of the contributions to the overall light output flux from the different types of light source.

The invention is applied to different technology types (e.g. laser diodes, LEDs, and SLEDs). The term "different type" thus indicates a different electrical response because of the intrinsic electrical characteristics of the technology type (e.g. a threshold behavior).

By way of example only, the invention will be described with reference to a light source circuit which combines LEDs and laser diodes. The laser diodes may be replaced with superluminescent diode, or a combination of laser diodes and superluminescent diodes.

Figure 2:
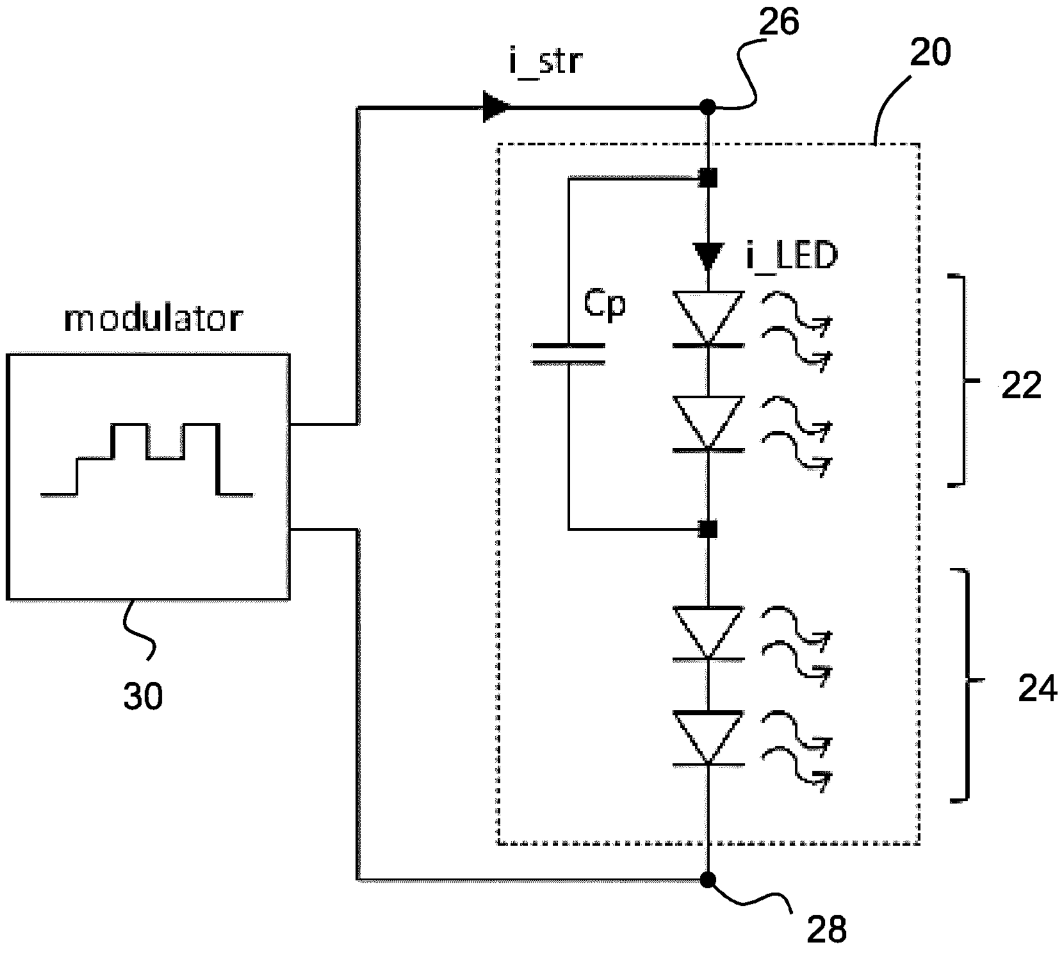
FIG. 2 shows a lighting circuit.

FIG. 2 shows a lighting circuit comprising a light source circuit 20 comprising a LED arrangement 22 (comprising a series string of LEDs) and a laser diode arrangement 24 (comprising a series string of laser diodes) in series. The light source circuit is connected between a first, anode, terminal 26 and a second, cathode, terminal 28.

The LED arrangement and/or the laser diode arrangement could comprise more complex circuit configurations, for example with multiple parallel branches.

A driver 30 generates a current i_str for delivery to the light source circuit 20.

The current comprises a DC component and a superposed modulated component, such as a pulse width modulation component. However, the driver can adjust the DC component (including generating a current with no DC component) and it can adjust the modulated component, for example by adjusting a duty cycle of a superposed pulse width modulated component (which may include a zero duty cycle i.e. no pulse width modulation component).

The string current i_str is thereby modulated by the driver 30.

In the preferred example shown, a capacitor circuit, represented as a single capacitor Cp, is connected in parallel with the LEDs of the LED arrangement 22.

Figure 3:
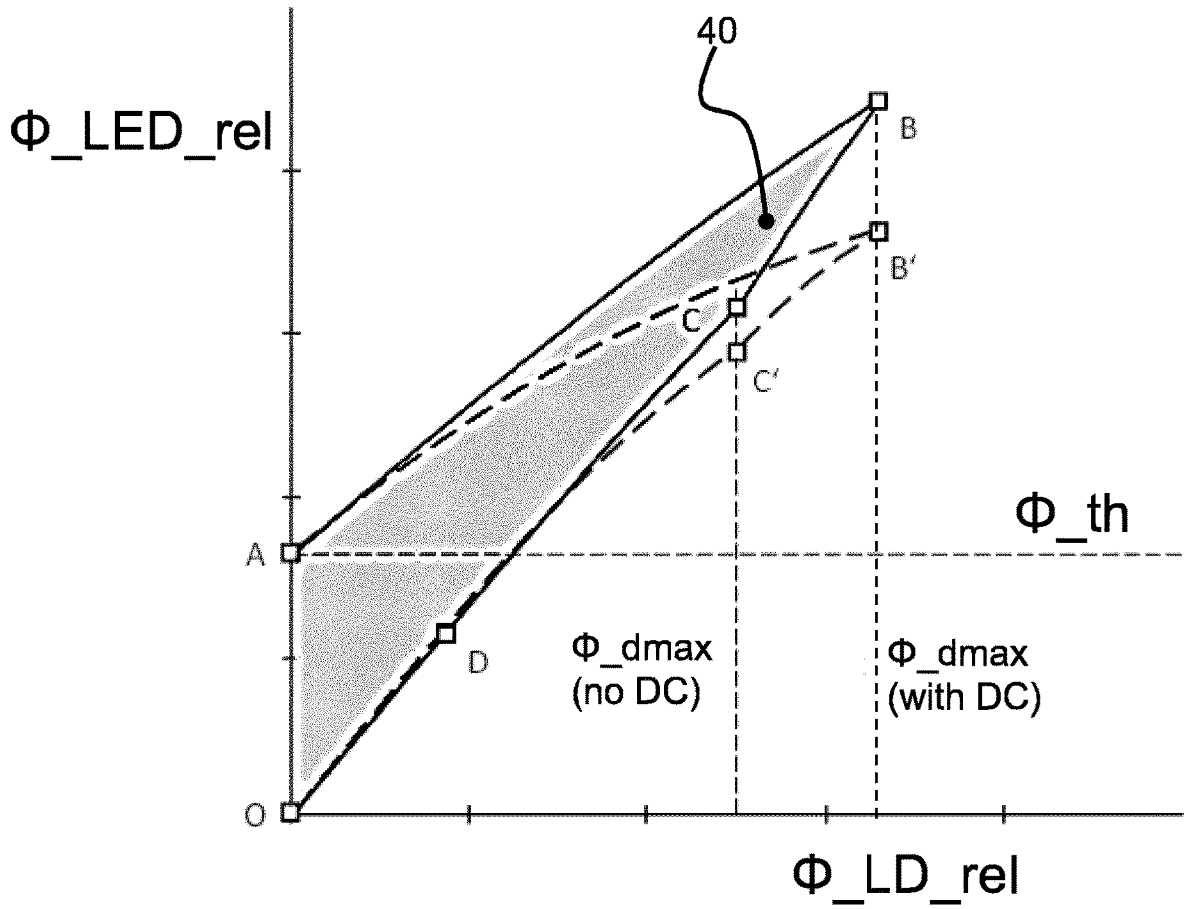
FIG. 3 shows how the relative contributions of the LED arrangement and the laser diode arrangement to the output flux may be adjusted.

FIG. 3 shows the LED flux (Φ_LED_rel) on the y-axis and the laser diode flux (Φ_LD_rel) on the x-axis. Again, relative flux values are shown so that they have the same maximum flux (at point B).

FIG. 3 is used to represent, as region 40, a main range over which the relative contributions of the LED arrangement and the laser diode arrangement to the output flux may be adjusted. This adjustment is by setting the level of the DC component of the controllable current and by setting the modulation of the superposed modulated component of the controllable current. Thus, points on the x=y line represent operating points where the light flux from the two types of light source is the same. Above that line, the LED light output is relatively more dominant and below that line the laser diode light output is relatively more dominant. Thus, by enabling operation away from the x=y line, the light output mixture is controlled.

The dotted area is discussed further below.

FIG. 3 shows various operating points, to explain the operation of the circuit.

Point A

The current has only a DC component, and it is below the threshold current (i_th_LD in FIG. 1) for the laser diode arrangement. The DC operation of point A thus results in LED radiation only while the DC current stays below the laser diode threshold current (i_th_LD). The LED flux is Φ_th.

Point B

Here, a pulse width modulated current is superimposed onto the DC current with a given (e.g. fixed) amplitude and a variable duty cycle. Point B is at the maximum duty cycle dmax.

For the region 40, the frequency of the pulse width modulation component is kept well above a frequency corresponding to the time constant formed by the capacitor circuit Cp and the dynamic resistance Rdyn of the LED arrangement (the time constant is Cp*Rdyn).

Thus, the LEDs of the LED arrangement still experience a DC current while the laser diode arrangement is pulse width modulated. For point B, the rated maximum current results from the amplitude and maximum duty cycle.

Varying the duty cycle from zero to the maximum duty cycle (dmax) of point B while keeping the maximum DC current i_th_LD moves the operation from point A to B.

Point C

Point C represents the removal of the DC current component while retaining the maximum duty cycle dmax. Removing the DC offset affects the LED arrangement light output more than the laser diode light output.

Point D

Between points C and O (the origin) the duty cycle is reduced from its maximum value dmax down to zero. Along this trajectory, the light from the laser diode arrangement is more pronounced than the LED arrangement light output.

The area 40 thus represents an operating window, bounded by the maximum and zero levels of the DC current and the maximum and zero duty cycle ratios. Any point within the operating window 40 may be selected by controlling these two parameters.

Point B' and point C':

The LED arrangement light output can be somewhat further dimmed with respect to the laser diode arrangement light output if the frequency of the pulse width modulation component is reduced. In particular, the frequency can be reduced to below the frequency corresponding to the time constant of the LED circuit and its parallel capacitor (i.e. the frequency 1/Cp*Rdyn). The parallel capacitor may also be entirely or partly formed by the parasitic capacitance of the LEDs.

The droop effect is more pronounced in LEDs compared to laser diodes, that hardly show any deviation from a linear flux-current characteristic. As explained further below, the result is that frequency control can adjust the LED brightness relative to the laser diode brightness.

Thus, the driver may also be able to adjust the frequency of the superposed pulse width modulated component. The effect is to reduce the maximum LED flux while retaining the maximum flux of the laser diode arrangement. Thus, the area 40 is distorted as shown.

The current through the LED arrangement is no longer essentially constant but instead oscillates between high and low flux states. The non-linear flux-current characteristic means the droop discussed above alters the average light flux.

Figure 4:
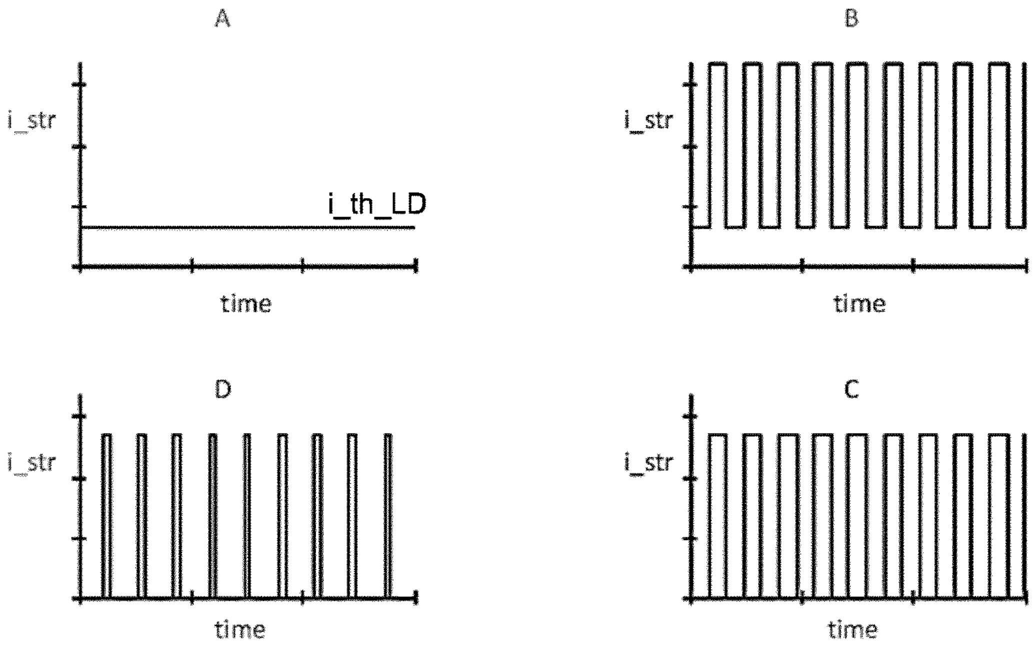
FIG. 4 shows the modulated current waveforms to operate at a set of operating points shown in FIG. 3.

FIG. 4 shows the modulated current waveforms for points A to D.

For point A, there is only a DC current at the threshold i_th_LD for the laser diode arrangement.

For point B, there is a high frequency superposed pulse width modulation component at the maximum duty cycle.

For point C, the DC component is removed but the maximum duty cycle is retained.

For point D, the DC component is still removed and duty cycle is reduced.

Figure 5:
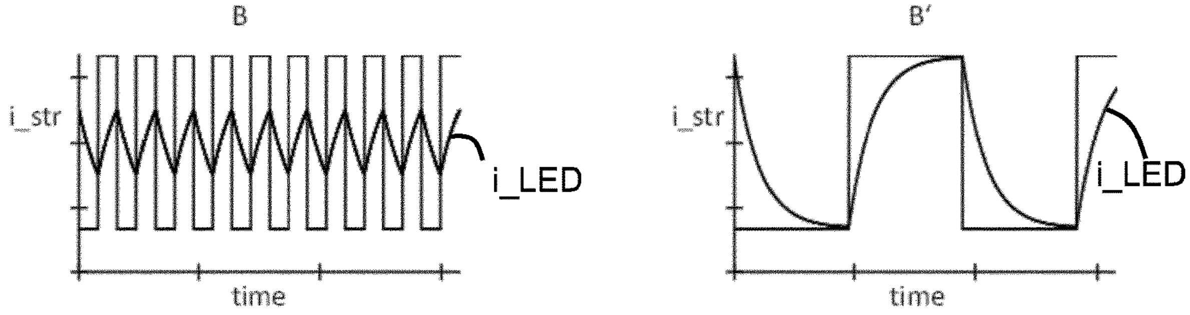
FIG. 5 shows the effect of the capacitor circuit by showing the modulated current waveforms to operate at further operating points shown in FIG. 3.

FIG. 5 shows the effect of the capacitor circuit and shows the points B and B'.

For point B, the high frequency (above 1/Cp*Rdyn) superposed pulse width modulation component at the maximum duty cycle gives rise to only a small cyclic oscillation in the LED current i_LED, but the current remains essentially DC since the time constant of those charging cycles is much larger than the period of the pulse width modulation oscillations.

For point B', the frequency of the superposed pule width modulation component is reduced (below 1/Cp*Rdyn). The time constant of the charging cycles of the LED arrangement current i_LED is now shorter than the period of the oscillations. The current i_LED thereby rises and falls between the minimum and maximum values instead of having only small cyclic variations. As a result, the average light flux reduces, because the time periods of high light output when the current is highest are affected by the droop in the flux-current characteristic.

In other words, the light output resulting from a constant average current is not the same as the average light output from a time-varying current between minimum and maximum values.

The high and low frequencies are for example 10 kHz and 1 kHz or 100 kHz and 10 kHz.

Thus, the high frequency may be between 5 and 100 times the low frequency.

If the light output at point B is taken as the maximum level for both sources, then the radiation from the one source may for example be altered by a maximum amount in the range 10% to 20% of that maximum value, while keeping the radiation from the other source unchanged.

Thus, even with a single current signal provided to the series arrangement of the LED arrangement 22 and the laser diode arrangement 24, a significant range of adjustment is achievable.

The example above shows a string of LEDs in the LED arrangement, with a single capacitor circuit (a single capacitor in the example shown) in parallel. The LED arrangement may instead comprise at least two sets of LEDs in series (e.g. of different colors). The capacitor circuit may then comprise a respective capacitor circuit in parallel with each set of LEDs or else there may be capacitor circuits in parallel with only a subset of the sets of LEDs.

Thus, a parallel capacitor may be connected over part of the LEDs only, or various different capacitors may be used for subsections of the LEDs. In this way, the flux from the different sets of LEDs may be somewhat adjusted with respect to each other.

The laser diodes are typically high current devices unlike the LEDs. The laser diode arrangement may thus be in series with several parallel branches of LEDs to provide suitable current levels for the different device types.

The pulsed operation achieved by the pulse width modulation component may be used for modulated light applications like Coded Light or LiFi.

By way of example, the amplitude of the superposed pulse width modulated component may be in the range 0 to 5 times the amplitude of the DC component.

The maximum amplitude of the DC component is for example 20A or less, or 4 A or less for generic components. Similarly, the maximum amplitude of the superposed pulse width modulated component is for example 20A or less, or 4 A or less for generic components.

The amplitude of the superposed pulse width modulated component is for example controllable in the range OA to the maximum (wherein OA means one type is not activated). Similarly, the amplitude of the DC component is for example controllable in the range OA to the maximum (wherein OA means one type is not activated).

The driver which may be used for example has a simple structure in which two sources are connected in series, where one source supplies the DC current, and the other source supplies the pulsed current.

Figure 6:
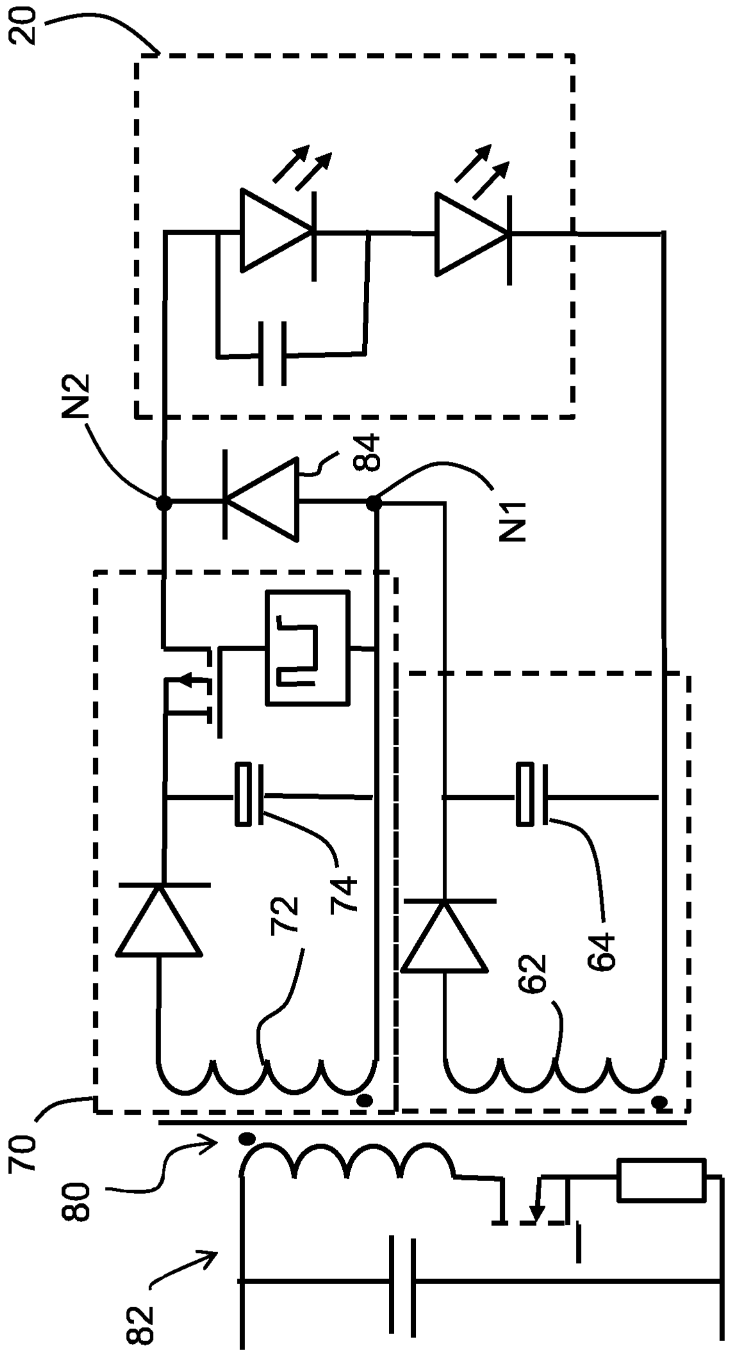
FIG. 6 shows an example of a driver.

FIG. 6 shows in simplified form a driver having a first part 60 for supplying the DC component of the controllable current and a second part 70 for supplying the modulated component of the controllable current. In this example, the two parts provide currents which are summed at a summing node. Each comprises a respective secondary winding 62, 72 of an isolating transformer 80 at the output of a switch mode power converter 82.

The first part 60 has a storage capacitor 64 and it delivers the DC component to a node N1 which serves as the ground terminal of the second part 70. The output N1 of the first part forms the ground of the second part. The second part 70 has a storage capacitor 74 and it delivers the modulated component to a node N2 which connects to the light source circuit 20. The node N2 is a current summation node for the DC current and the modulated current.

A diode 84 is connected between the nodes N1 and N2. The diode 84 is thus in parallel with the second part 70 and provides a conduction path for the current from the first part 60 when the second part is not applying the current pulse. The output from the second part cannot flow back to the first part as a result of the diode 84.

The example described above is based on a pulse width modulation to the modulated component of the controllable current. Instead of a PWM signal, a sinusoidal waveform with DC-offset current may be applied, and this may improve EMC (Electro Magnetic Compatibility), where the amplitude and DC offset are adjusted to achieve similar results as with a PWM signal. Any other waveform may be used as long as it makes use of the combination of a DC offset and an amplitude modulated part, to vary the emitted power of the laser diode arrangement and LED arrangement.

The lighting circuit described above is for example used within a lighting device which emits white light, having a color temperature in a range from 2000K-6000K, a Color Rendering Index of at least 80 and/or a color point within 8 steps of standard deviation color matching from the black body locus.

The light sources may comprise laser diodes (optionally having a phosphor conversion layer) and LEDs, emitting in different spectral ranges, as in the example described above. A DC component, a frequency and a duty cycle of the superposed pulse modulated current of the driver are for example adjusted to tune the output of the light source to a certain color point in the range of 2700K-7000K with a Color Rendering Index in the range 80 to 95.

The lighting device is for example integrated into a lamp (e.g. with an electrical connector cap and an envelope for at least partly enclosing the light source arrangements), or into a luminaire having a housing with a fixing for fixing the luminaire to a wall or a ceiling.

The invention is of particular interest for lighting systems with tunable color point, for example with using a blue laser in combination with a green-yellow phosphor, and red LEDs to increase the color rendering index. The invention may be used for a laser-based light source with an adjustable melanopic daylight efficacy ratio (MDER) for example using a cyan LED.

In the examples provided, the light source circuit may only receive current from the driver 30. This may result in that no other current sources provide a current to any of the light source arrangements. The light source circuit may then receive only a single current, from the driver 30, which is then the controllable current that has a DC component and a superposed modulated component.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting circuit, comprising:

a light source circuit comprising a first light source arrangement, and a second light source arrangement, of a different type to the first light source arrangement, in series; and a driver for delivering a controllable current to the light source circuit, wherein the driver is configured to set a DC component of the controllable current and to set a modulation of a superposed modulated component of the controllable current, wherein the controllable current provided to the light source circuit provides a light output distribution between the first light source arrangement and the second light source arrangement, wherein the light source circuit receives current from the driver such that the light source circuit is adapted to receive a single current from the driver;

wherein the first light source arrangement is an LED arrangement and the second source arrangement is a laser diode arrangement and/or a superluminescent diode arrangement.

2. The lighting circuit of claim 1, wherein the driver is configured to set a DC current component below a threshold current of the laser diode arrangement and/or superluminescent diode arrangement.

3. The lighting circuit of claim 1, wherein the driver is configured to set a modulation by setting a duty cycle of a superposed pulse width modulated component of the controllable current.

4. The lighting circuit of claim 3, wherein the amplitude, or a maximum amplitude, of the superposed pulse width modulated component is 5 times the maximum amplitude of the DC component.

5. The lighting circuit of claim 1, wherein the driver is configured to set the frequency of the superposed modulated component.

6. The lighting circuit of claim 1, wherein the driver is configured to set the amplitude of the superposed modulated component.

7. The lighting circuit of claim 1, wherein the amplitude, or the maximum amplitude, of the superposed modulated component is a current of 20 A.

8. The lighting circuit of claim 1, wherein the maximum amplitude of the DC component is a current of 20 A.

9. The lighting circuit of claim 1, further comprising a capacitor circuit in parallel with the first light source arrangement and the first light source arrangement is a LED arrangement.

10. The lighting circuit of claim 9, wherein the driver is configured to set the frequency of the superposed modulated component selectively above or below a frequency corresponding to a time constant of the combination of the LED arrangement and the capacitor circuit.

11. The lighting circuit of claim 9, wherein the LED arrangement comprises at least two sets of LEDs in series, and wherein the capacitor circuit comprises a respective capacitor circuit in parallel with each set of LEDs.

12. The lighting circuit of claim 9, wherein the LED arrangement comprises at least two sets of LEDs in series, and wherein the capacitor circuit comprises a capacitor circuit in parallel with only a subset of the sets of LEDs.

13. The lighting circuit of claim 1, wherein the driver comprises a first part for delivering the DC component and a second part for delivering the modulated component.

14. A luminaire comprising:

a lighting circuit, the lighting circuit comprising:

a light source circuit comprising a first light source arrangement, and a second light source arrangement, of a different type to the first light source arrangement, in series; and a driver for delivering a controllable current to the light source circuit, wherein the driver is configured to set a DC component of the controllable current and to set a modulation of a superposed modulated component of the controllable current, wherein the controllable current provided to the light source circuit provides a light output distribution between the first light source arrangement and the second light source arrangement, wherein the light source circuit receives current from the driver such that the light source circuit is adapted to receive a single current from the driver, wherein the first light source arrangement is an LED arrangement and the second source arrangement is a laser diode arrangement and/or a superluminescent diode arrangement.

15. The luminaire of claim 14, wherein the driver is configured to set a DC current component below a threshold current of the laser diode arrangement and/or superluminescent diode arrangement.

16. The luminaire of claim 14, wherein the driver is configured to set a modulation by setting a duty cycle of a superposed pulse width modulated component of the controllable current.

17. The luminaire of claim 14, further comprising a capacitor circuit in parallel with the first light source arrangement and the first light source arrangement is a LED arrangement.

18. The luminaire of claim 17, wherein the driver is configured to set the frequency of the superposed modulated component selectively above or below a frequency corresponding to a time constant of the combination of the LED arrangement and the capacitor circuit.

19. The luminaire of claim 17, wherein the LED arrangement comprises at least two sets of LEDs in series, and wherein the capacitor circuit comprises a capacitor circuit in parallel with only a subset of the sets of LEDs.

* * * * *